(12) United States Patent
Yanagawa et al.

(10) Patent No.: US 9,027,866 B2
(45) Date of Patent: May 12, 2015

(54) WEBBING TAKE-UP DEVICE

(75) Inventors: Wataru Yanagawa, Aichi-ken (JP); Masaru Ukita, Aichi-ken (JP); Yoshiaki Maekubo, Aichi-ken (JP)

(73) Assignee: Kabushiki Kaisha Tokai-Rika-Denki-Seisakusho, Aichi-Ken (JP)

( * ) Notice: Subject to any disclaimer, the term of this patent is extended or adjusted under 35 U.S.C. 154(b) by 683 days.

(21) Appl. No.: 13/154,994

(22) Filed: Jun. 7, 2011

(65) Prior Publication Data

US 2011/0315805 A1 Dec. 29, 2011

(30) Foreign Application Priority Data

Jun. 23, 2010 (JP) ................................. 2010-142883

(51) Int. Cl.
*B60R 22/38* (2006.01)
*B60R 22/28* (2006.01)

(52) U.S. Cl.
CPC ........... *B60R 22/38* (2013.01); *B60R 2022/287* (2013.01)

(58) Field of Classification Search
CPC .. B60R 22/341; B60R 22/3413; B60R 22/36; B60R 22/38; B60R 22/40; B60R 22/405; B60R 2022/287; B60R 2022/288; B60R 2022/468
USPC ........ 242/374, 379.1, 383, 383.2, 383.5, 384, 242/394, 396.1, 396.4; 280/805–807; 297/471, 472, 476–478
See application file for complete search history.

(56) References Cited

U.S. PATENT DOCUMENTS

| 3,955,774 | A | * | 5/1976 | Weman ...................... 242/383.5 |
| 4,177,962 | A | * | 12/1979 | Hildebrandt ............... 242/383.5 |
| 4,497,458 | A | * | 2/1985 | Gueguen et al. ........... 242/383.2 |
| 5,485,971 | A | * | 1/1996 | Nakaya et al. ............. 242/381.1 |
| 5,779,177 | A | * | 7/1998 | Kielwein .................. 242/382.6 |
| 6,068,208 | A | * | 5/2000 | Matsuki et al. ............ 242/383.2 |
| 2007/0241223 | A1 | * | 10/2007 | Boelstler et al. ............. 242/374 |
| 2008/0203210 | A1 | * | 8/2008 | Nagata et al. .............. 242/396.1 |

FOREIGN PATENT DOCUMENTS

| JP | 3083050 | 6/2001 |
| JP | 2004190713 | 7/2004 |
| JP | 2007084042 | 4/2007 |

OTHER PUBLICATIONS

Japanese Office Action and English translation of Notice of Reasons for Rejection mailed Sep. 3, 2013.

* cited by examiner

*Primary Examiner* — Sang Kim
(74) *Attorney, Agent, or Firm* — Roberts Mlotkowski Safran & Cole P.C.

(57) ABSTRACT

A webbing take-up device that is both capable of promoting reductions in size and weight and capable of excellently maintaining coupling strength between a pawl member and a ring portion. A clutch plate and a lock ring of this webbing take-up device are coupled by plural teeth provided at the clutch plate meshing with plural teeth provided at the lock ring. This lock ring is specified to have a lower material strength than the clutch plate. A tooth height H2 of the plural teeth of the lock ring is specified to be lower than a tooth height of the plural teeth of the clutch plate. Thus, when the lock ring and the clutch plate mesh, tooth tips of the plural teeth of the clutch plate come into contact with tooth bottoms of the plural teeth of the lock ring.

6 Claims, 6 Drawing Sheets

WEBBING TAKE-UP DEVICE

CROSS-REFERENCE TO RELATED APPLICATION

This application claims priority under 35 USC 119 from Japanese Patent Application No. 2010-142883 filed on Jun. 23, 2010, the disclosure of which is incorporated by reference herein.

BACKGROUND

1. Technical Field

The present invention relates to a webbing take-up device.

2. Related Art

Heretofore, a webbing take-up device has been known that is provided with: a torsion shaft that rotates integrally with a spool; and a load transmission mechanism that transmits a load to a frame that rotatably supports the spool (for example, see Japanese Patent Application Laid-Open (JP-A) No. 2007-84042).

In the webbing take-up device disclosed in JP-A No. 2007-84042, a second lock base is integrally joined to the torsion shaft, and a second lock pawl is turnably attached to this second lock base. A lock ring, which is supported at the frame, is disposed at the radial direction outer side of the second lock base, and a ratchet is formed at an inner periphery portion of the lock ring. When the second lock pawl turns toward the lock ring, a ratchet formed at a distal end of the second lock pawl meshes with the ratchet of the lock ring. Thus, the torsion shaft and the lock ring are coupled via the second lock pawl and suchlike, and a load inputted at the spool side is transmitted to the frame side.

In recent years, with more numerous functions and reduced weight in vehicles, reductions in size and weight of webbing take-up devices have been called for. Accordingly, it is necessary to achieve further reductions in size and weight of structural members of a load transmission mechanism as described above. However, it is also necessary to maintain excellent coupling strength between the second lock pawl (a pawl member) and the lock ring (a ring portion).

SUMMARY

The present invention has been made in consideration of the problem described above, and an object of the present invention is to provide a webbing take-up device that is both capable of promoting reductions in size and weight and capable of excellently maintaining coupling strength between a pawl member and a ring portion.

In order to solve the problem described above, a first aspect of the present invention provides a webbing take-up device including:

a rotary member that rotates integrally with a spool; and a load transmission mechanism that transmits a load between the spool and a frame that rotatably supports the spool, wherein the load transmission mechanism comprises:

a ring portion provided at the frame side thereof, a plurality of teeth being provided at an inner periphery portion of the ring portion, which inner periphery portion is concentric with the rotary member; and a pawl member disposed at the inner side of the ring portion, the pawl member being supported at the rotary member to be movable to a meshing position, at which a plurality of teeth provided at a distal end portion of the pawl member mesh with the plurality of teeth provided at the ring portion, and wherein one of the ring portion or the pawl member has a material strength specified to be lower than the other, and a tooth height of the teeth provided at the one is specified to be lower than a tooth height of the teeth provided at the other.

In the webbing take-up device according to the first aspect, the plural teeth are provided at the inner periphery portion of the ring portion provided at the frame. The pawl member, which is supported at the rotary member that rotates integrally with the spool, is movable toward the meshing position at which the plural teeth provided at the distal end portion of the pawl member mesh with the plural teeth of the ring portion, and the ring portion and the pawl member are coupled by this meshing. Hence, loads (torques) may be transmitted between the spool and the frame.

In this webbing take-up device, one of the ring portion and the pawl member is specified to have a material strength lower than the other. In addition, the height of the teeth provided at the one (the member with the lower material strength) is specified to be lower than the height of the teeth provided at the other (the member with the higher material strength). Therefore, when meshed as described above, the tips of the teeth provided at the member with the higher material strength may be engaged with the bottoms of the teeth provided at the member with the lower material strength, and thus the material with the lower material strength receives a load from the member with the higher material strength at the tooth bottom side thereof, at which the cross-sectional areas of the teeth are larger. Therefore, a shear area of the member with the lower material strength is specified to be larger, and thus a coupling strength between the pawl member and the ring portion may be excellently maintained.

Therefore, a required coupling strength may be maintained with minimal sizes of the teeth of the pawl member and the ring portion. Therefore, reductions in size and weight of the pawl member and the ring portion may be promoted, and hence reductions in size and weight of the device may be promoted. Herein, the material strengths relating to the first aspect may be compared according to, for example, tensile strengths of the materials.

A webbing take-up device relating to a second aspect of the invention is the webbing take-up device according to the first aspect, in which, when the teeth mesh, tooth tips of the teeth provided at the other of the ring portion or the pawl member come into contact with tooth bottoms of the teeth provided at the one member.

In the webbing take-up device according to the second aspect, when the pawl member and the ring portion mesh, the tips of the teeth provided at the member with the higher material strength abut against the bottoms of the teeth provided at the member with the lower material strength. Therefore, the member with the lower material strength receives a load from the member with the higher material strength at the tooth bottoms, where the cross-sectional areas of the teeth are largest. Therefore, the shear area of the member with the lower material strength may be set to a maximum, and the coupling strength between the pawl member and the ring portion may be even more excellently maintained.

A webbing take-up device relating to a third aspect of the invention is the webbing take-up device according to the first aspect or the second aspect, in which the distal end portion of the pawl member is curved so as to match a curve of the inner periphery portion of the ring portion in a state in which the pawl member is disposed at the meshing position.

In the webbing take-up device according to the third aspect, the distal end portion of the pawl member is curved so as to match the curve of the inner periphery portion of the ring portion. Therefore, the plural teeth provided at the distal end portion of the pawl member may be simultaneously or substantially simultaneously meshed with the plural teeth provided at the ring portion. Thus, the tips of the plural teeth provided at the other of the pawl member and the ring portion (the member with the higher material strength) may come into contact with the bottoms of the plural teeth provided at the one (the member with the lower material strength) simultaneously or substantially simultaneously, and the coupling strength between the pawl member and the ring portion may be even more excellently maintained.

A webbing take-up device relating to a fourth aspect of the invention is the webbing take-up device according to the third aspect, in which a radius of curvature of a circular arc joining the tooth bottoms of the plurality of teeth provided at the one of the ring portion or the pawl member is specified to be equal to a radius of curvature of a circular arc joining the tooth tips of the plurality of teeth provided at the other of the ring portion or the pawl member.

In the webbing take-up device according to the fourth aspect, the radius of curvature of the circular arc joining the bottoms of the plural teeth provided at the one of the pawl member and the ring portion (the member with the lower material strength) is specified to be equal to the radius of curvature of the circular arc joining the tips of the plural teeth provided at the other (the member with the higher material strength). Therefore, when the pawl member and the ring portion are meshed (are coupled), the tips of the plural teeth provided at the member with the higher material strength may come into contact with the bottoms of the plural teeth provided at the member with the lower material strength simultaneously or substantially simultaneously. Therefore, the coupling strength between the pawl member and the ring portion may be realized at a maximum.

Herein, the term "equal" relating to the fourth aspect does not necessarily mean identical; operation and effect the same as the operation and effect described above may be obtained even if a dimensional error of the order of, for example, several hundredths of a millimeter arises in fabrication. In other words, it is sufficient if, in accordance with deformation of one or both of the pawl member and the ring portion during transmission of a load, most of the tips of the plural teeth provided at the member with the higher material strength come into contact with the bottoms of the plural teeth provided at the member with the lower material strength.

As described hereabove, a webbing take-up device relating to the present invention may both promote reductions in size and weight and excellently maintain coupling strength between a pawl member and a ring portion.

BRIEF DESCRIPTION OF THE DRAWINGS

An exemplary embodiment of the present invention will be described in detail based on the following figures, wherein.

DETAILED DESCRIPTION

Herebelow, an exemplary embodiment of the present invention is described on the basis of the attached drawings.

Figure 1:
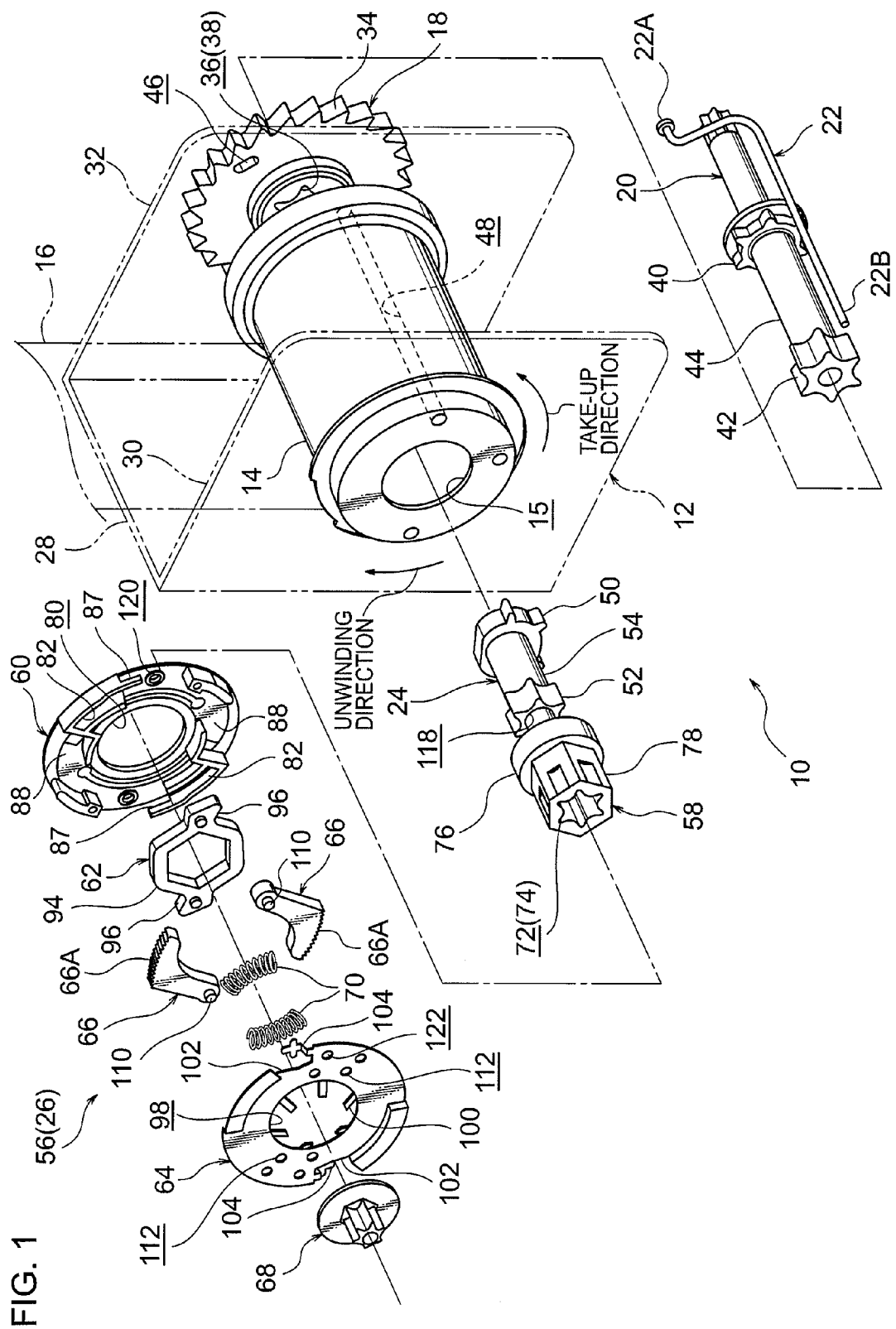
FIG. 1 is an exploded perspective diagram illustrating structure of principal portions of a webbing take-up device relating to an exemplary embodiment of the present invention.
Figure 2:
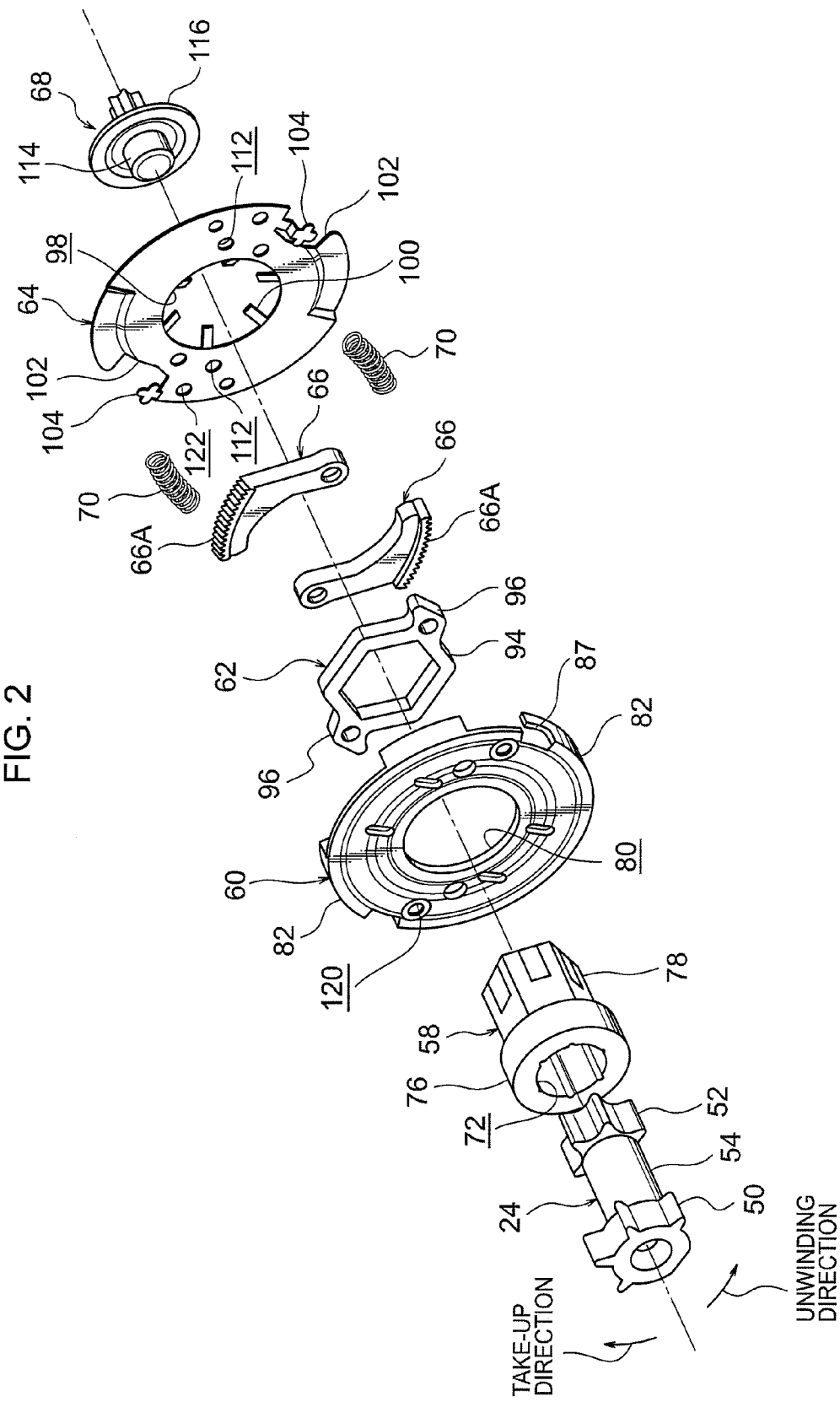
FIG. 2 is an exploded perspective diagram illustrating partial structure of a load transmission mechanism, which is a structural member of the webbing take-up device illustrated in FIG. 1.

As illustrated in FIG. 1 and FIG. 2, a webbing take-up device 10 relating to the exemplary embodiment of the present invention includes a frame 12, a spool 14, a webbing belt 16, a lock gear 18, a main torsion shaft 20, a trigger wire 22, a sub torsion shaft 24 that serves as a rotary member, and a load transmission mechanism 26.

The frame 12 includes a plate-form back plate 28 fixed to a vehicle body. Leg pieces 30 and 32 extend substantially orthogonally from each of two width direction end portions of the back plate 28. Thus, the frame 12 forms a substantial three-sided rectangular shape in plan view.

The spool 14 is formed in a circular tube shape with a penetrating hole 15 that penetrates therethrough in the axial direction. The spool 14 is disposed between the leg piece 30 and the leg piece 32 of the frame 12. The spool 14 is disposed in a state in which the axial direction thereof is along the direction of opposition of the leg piece 30 and leg piece 32. The spool 14 is rotatably supported at the frame 12 via the main torsion shaft 20, the sub torsion shaft 24 and the like, which are described below.

The webbing belt 16 is applied to the body of a vehicle occupant, and a base end portion of the webbing belt 16, which is one length direction end portion thereof, is anchored at the spool 14. The spool 14 takes up the webbing belt 16 from the base end thereof by rotating in a winding direction, which is one direction of rotation, and accommodates the webbing belt 16.

The lock gear 18 is disposed coaxially with the spool 14 at one axial direction end of the spool 14. A gear portion 34 is formed at an outer periphery portion of the lock gear 18. A penetrating hole 36 is formed at an axial center portion of the lock gear 18 and penetrates through the lock gear 18 in the axial direction thereof. A spline-form engaging object portion 38 is formed at an inner periphery portion of this penetrating hole.

The main torsion shaft 20 is disposed coaxially with the spool 14 and the lock gear 18, and is inserted into both the penetrating hole 15 of the spool 14 and the penetrating hole 36 of the lock gear 18. A spline-form first engaging portion 40 is formed at a length direction central portion of the main torsion shaft 20, and a spline-form second engaging portion 42 is formed at a distal end portion of the main torsion shaft 20.

The main torsion shaft 20 is integrally rotatably fixed to the lock gear 18 by the first engaging portion 40 being engaged with the engaging object portion 38 of the lock gear 18. The main torsion shaft 20 is integrally rotatably fixed to the spool 14 by the first engaging portion 40 being engaged with an unillustrated engaging object portion that is formed at an axial direction central portion of an inner periphery portion of the spool 14.

A portion of the main torsion shaft 20 between the first engaging portion 40 and the second engaging portion 42 is constituted to serve as a first energy-absorbing portion 44, for absorbing energy introduced by tensing of the webbing belt 16, as described below.

The trigger wire 22 extends along the main torsion shaft 20. As illustrated in FIG. 1, a base end portion 22A of the trigger wire 22 is inserted into a hole portion 46, which is formed at a position of the lock gear 18 at the radial direction outer side relative to the penetrating hole 36, and is anchored at the lock gear 18. A distal end from the base end portion of the trigger wire 22 is inserted into a hole portion 48, which is formed in the spool 14 in parallel with the penetrating hole 15, and a distal end portion 22B of the trigger wire 22 protrudes from the spool 14 at the other axial direction end of the spool 14.

The sub torsion shaft 24 is disposed to be coaxial with the main torsion shaft 20. A base end side relative to a length direction central portion of the sub torsion shaft 24 is inserted into the penetrating hole 15 of the spool 14. A distal end side relative to the length direction central portion of the sub torsion shaft 24 protrudes from the axial direction other end of the spool 14.

A spline-form first engaging portion 50 is formed at a base end portion of the sub torsion shaft 24, and a spline-form second engaging portion 52 is similarly formed at a distal end portion of the sub torsion shaft 24. The first engaging portion 50 is engaged with an unillustrated engaging object portion formed at an axial direction central portion of the inner periphery portion of the spool 14. Thus, the sub torsion shaft 24 is integrally rotatably fixed to the spool 14.

A portion of the sub torsion shaft 24 between the first engaging portion 50 and the second engaging portion 52 is constituted to serve as a second energy-absorbing portion 54, for absorbing energy introduced by tensing of the webbing belt 16 as described below.

The load transmission mechanism 26 includes a clutch mechanism 56. The clutch mechanism 56 is provided with a sleeve 58, a clutch guide 60, a clutch base 62, a clutch cover 64, a pair of clutch plates 66 that serve as pawl members, a screw 68 and a pair of coil springs 70.

The sleeve 58 is disposed coaxially with the sub torsion shaft 24. A penetrating hole 72 is formed at an axial center portion of the sleeve 58, and penetrates through the sleeve 58 in the axial direction. The sub torsion shaft 24 described above is inserted with play into this penetrating hole 72. A spline-form engaging object portion 74 is formed at a distal end side of an inner periphery portion of this sleeve 58. The sleeve 58 is integrally rotatably fixed to the sub torsion shaft 24 by the second engaging portion 52 being engaged with the engaging object portion 74.

A base end side of the sleeve 58 is constituted as a support portion 76 with a circular profile. A distal end side of the sleeve 58 from the support portion 76 is constituted as a fitting portion 78 with a hexagonal profile.

The clutch guide 60 is a resin molded component, and is formed in an annular shape including a penetrating hole 80 that penetrates therethrough in the axial direction. The above-mentioned support portion 76 is fitted into this penetrating hole 80. Thus, the clutch guide 60 is relatively rotatably supported at the sleeve 58, and hence at the sub torsion shaft 24.

Figure 3:
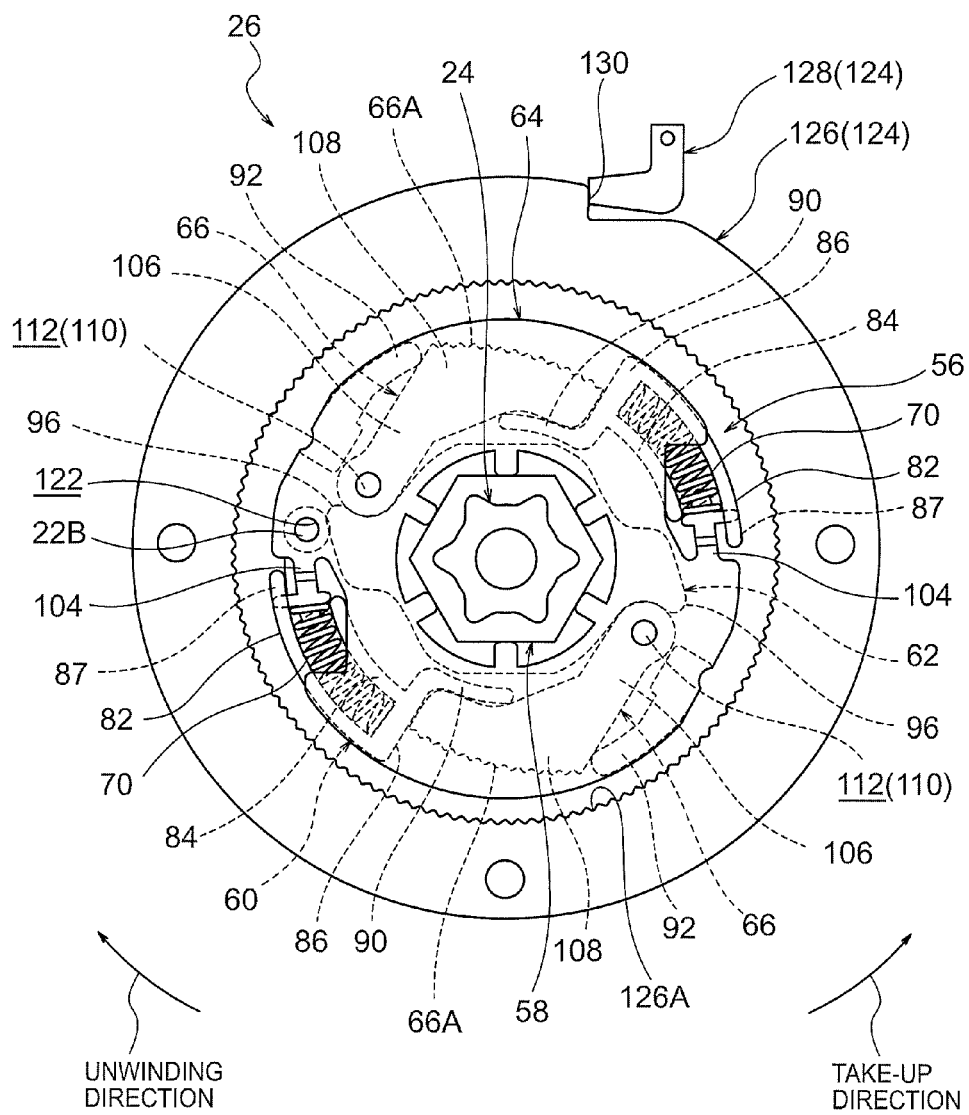
FIG. 3 is a diagram of the load transmission member that is a structural member of the webbing take-up device illustrated in FIG. 1, viewed from the opposite side thereof from a side at which a spool is disposed.

As illustrated in FIG. 3, a pair of coil spring accommodation portions 82, which accommodate the coil springs 70, are formed at two circumferential direction locations of the clutch guide 60. The coil spring accommodation portions 82 are formed with point symmetry about the central portion of the clutch guide 60. Each coil spring accommodation portion 82 is formed in a substantial three-sided rectangular shape including an outer wall portion 82, an inner wall portion 84 and a connecting wall portion 86. The outer wall portion 82 and inner wall portion 84 extend in the circumferential direction of the clutch guide 60. The connecting wall portion 86 extends in the radial direction of the clutch guide 60 and connects end portions of the outer wall portion 82 and the inner wall portion 84. An incision portion 87 is formed in an end portion of the outer wall portion 82 at the opposite end thereof from the end at which the connecting wall portion 86 is disposed. The incision portions 87 correspond with cross-shaped pawls 104 of the clutch cover 64, which are described below.

A pair of clutch plate accommodation portions 88 are formed in the clutch guide 60, adjacent to the coil spring accommodation portions 82. The clutch plate accommodation portions 88 accommodate the clutch plates 66. At each clutch plate accommodation portion 88, a first support wall portion 90 and a second support wall portion 92 are formed. The first support wall portion 90 extends from the connecting wall portion 86 to the opposite side thereof from the side at which the inner wall portion 84 is disposed. The second support wall portion 92 is distant from the connecting wall portion 86 at the opposite side thereof from the side at which the outer wall portion 82 is disposed.

The clutch base 62 includes an annular fitting object portion 94 with a hexagonal shape. The fitting portion 78 is fitted (pushed into) the inner side of the fitting object portion 94. Thus, the clutch base 62 is integrally rotatably fixed to the sleeve 58. A pair of anchoring portions 96 is also formed at the clutch base 62. The anchoring portions 96 protrude to the outer side from the fitting object portion 94. These anchoring portions 96 are anchored with base end portions of arm portions 106 formed at the clutch plates 66, which are described below.

The clutch cover 64 is disposed coaxially with the sleeve 58, and is disposed to oppose the clutch guide 60 at the opposite side of the clutch guide 60 from the side thereof at which the spool 14 is disposed. The clutch cover 64 is formed in an annular shape with a penetrating hole 98 that penetrates therethrough in the axial direction. Fitting pawls 100 are plurally formed at an inner periphery portion of the clutch cover 64. The fitting pawls 100 protrude to the radial direction inner side. The fitting portion 78 mentioned above is inserted into the penetrating hole 98, and the plural fitting pawls 100 fit into the fitting portion 78. Thus, the clutch cover 64 is integrally rotatably fixed to the sleeve 58, and hence to the sub torsion shaft 24.

Incision portions 102 are formed at two circumferential direction locations of the clutch cover 64. Viewed in the axial direction, the incision portions 102 are formed in three-sided rectangular shapes that open to the radial direction outer side. A pair of the cross-shaped pawls 104 is also formed at the clutch cover 64. The cross-shaped pawls 104 are formed so as to be disposed in the incision portions 102, and the cross-shaped pawls 104 are formed with point symmetry about the central portion of the clutch cover 64. By the cross-shaped pawls 104 being caught in the above-mentioned incision portions 87, the clutch cover 64 and the clutch guide 60 are prevented from moving apart in the axial direction.

Each clutch plate 66 is disposed between the clutch cover 64 and the clutch guide 60. The clutch plate 66 includes the arm portion 106 and a circular arc portion 108 that is formed at a distal end portion of the arm portion 106.

A turning axle 110 is formed at a base end portion of each arm portion 106. The turning axle 110 protrudes toward the clutch cover 64 and extends along the axial direction of the sub torsion shaft 24. By this turning axle 110 being inserted into a hole portion 112 formed in the clutch cover 64, the clutch plate 66 is turnably supported at the clutch cover 64. At an outer periphery portion of the circular arc portion 108 (a distal end portion of the clutch plate 66), a plural number of spur gear teeth 66A are formed. These teeth 66A are formed by, for example, linear knurling with a roller, pressing or the like, and are arranged side by side in the circumferential direction of the circular arc portion 108.

The screw 68 includes a threaded portion 114 and a push portion 116 with a larger diameter than the threaded portion 114. The threaded portion 114 engages by threading with a threaded hole 118 formed in a distal end portion of the sub torsion shaft 24. Thus, the screw 68 is fixed to the distal end portion of the sub torsion shaft 24. When the screw 68 has thus been fixed to the distal end portion of the sub torsion shaft 24, the push portion 116 abuts against a distal end portion of the sleeve 58. Hence, movement of the sleeve 58 in the direction of disengaging from the sub torsion shaft 24 is restricted.

Hole portions 120 and 122 are formed in the clutch guide 60 and the clutch cover 64, respectively. The distal end portion 22B of the trigger wire 22 is inserted into each of the hole portions 120 and 122. Thus, relative rotation of the clutch guide 60 with respect to the spool 14 and the clutch cover 64 is restricted.

In the state in which relative rotation of the clutch guide 60 with respect to the spool 14 and the clutch cover 64 is restricted, each cross-shaped pawl 104 is disposed in the vicinity of the opening portion of the coil spring accommodation portion 82 that is formed substantially in a three-sided rectangular shape. One axial direction end portion of the coil spring 70 accommodated in the coil spring accommodation portion 82 is anchored at the cross-shaped pawl 104, and the other axial direction end portion of the coil spring 70 is anchored at the connecting wall portion 86.

In this state, the distance between the cross-shaped pawl 104 and the connecting wall portion 86 is shorter than the total length of the coil spring 70 in a relaxed state. Thus, each coil spring 70 is in a compressed state. Therefore, urging force is acting on the clutch guide 60 in the take-up direction.

Meanwhile, in this state, a distance between each hole portion 112 of the clutch cover 64 (the turning axle 110 of each clutch plate 66) and the connecting wall portion 86 is maintained at a sufficient distance, and each clutch plate 66 is accommodated in the clutch plate accommodation portion 88 such that the plural teeth 66A are kept to the inner side relative to an outer periphery portion of the clutch guide 60. Furthermore, in this state each connecting wall portion 86 abuts against a distal end of the circular arc portion 108.

As illustrated in FIG. 3, this load transmission mechanism 26 includes a switching mechanism 124 in addition to the clutch mechanism 56 described above. The switching mechanism 124 includes a lock ring 126 that serves as a ring portion, an engaging member 128, and an unillustrated gas generator. The lock ring 126 is formed in a ring shape and is disposed to be coaxial with the clutch mechanism 56 at the radial direction outer side of the clutch mechanism 56. The lock ring 126 is attached to the leg piece 30 of the frame 12 to be relatively rotatable with respect thereto. A plural number of spur gear teeth 126A are formed at an inner periphery portion of the lock ring 126. The teeth 126A are formed by, for example, linear knurling with a roller, pressing or the like, and are arranged side by side in the circumferential direction of the lock ring 126. The teeth 126A are formed to be engageable (meshable) with the plural teeth 66A of the clutch plates 66.

The engaging member 128 engages with a recess portion 130 formed in an outer periphery portion of the lock ring 126. Thus, relative rotation of the lock ring 126 with respect to the frame 12 is restricted. When the unillustrated gas generator provided at the switching mechanism 124 receives an operation signal from an unillustrated electronic control unit (ECU) and operates, the engaging member 128 is rotated, and the state of engagement of the recess portion 130 of the lock ring 126 with the engaging member 128 is released. Therefore, the restriction on relative rotation of the lock ring 126 with respect to the frame 12 is released.

The webbing take-up device 10 relating to the present exemplary embodiment is configured to operate as follows.

In a state in which the webbing belt 16 has been unwound from the spool 14 and applied to the body of an occupant of the vehicle, if, for example, the vehicle goes into a state of rapid deceleration and an unillustrated lock mechanism operates, an unillustrated lock member provided at this lock mechanism is engaged with the gear portion 34 of the lock gear 18, and rotation of the lock gear 18 is restricted.

As a result, rotation of the spool 14, which is joined to the lock gear 18 via the main torsion shaft 20, in the unwinding direction is restricted, and unwinding of the webbing belt 16 from the spool 14 is restricted. Therefore, the body of the occupant, which is acting to move forward, is restrained by the webbing belt 16.

In the state in which rotation of the lock gear 18 is restricted, if the body of the occupant tenses the webbing belt 16 with a larger force, and a rotary force on the spool 14 in the unwinding direction due to the tension force exceeds a mechanical strength of the first energy-absorbing portion 44, the first energy-absorbing portion 44 twists and the spool 14 rotates in the unwinding direction by an amount corresponding to the twisting.

Accordingly, the webbing belt 16 unwinds from the spool 14 by the amount of rotation of the spool 14 in the unwinding direction. Thus, a load (burden) from the webbing belt 16 on a chest area of the occupant is moderated, and the energy introduced by the tensing of the webbing belt 16 is absorbed in an amount corresponding to the twisting.

The spool 14 rotating in the unwinding direction with respect to the lock gear 18 as described above conversely means that the lock gear 18 is relatively rotating in the take-up direction with respect to the spool 14. Thus, when the lock gear 18 relatively rotates in the take-up direction with respect to the spool 14, the base end portion of the trigger wire 22 is moved in the circumferential direction of the main torsion shaft 20 while the distal end of the trigger wire 22 from the base end portion stays inserted in the spool 14. Therefore, the distal end of the trigger wire 22 from the base end portion is pulled toward the lock gear 18 relative to the hole portion 48.

As a result, the distal end portion 22B of the trigger wire 22 is disengaged from the hole portion 120 of the clutch guide 60 and the hole portion 122 of the clutch cover 64, and the restriction on relative rotation of the clutch guide 60 with respect to the spool 14 and the clutch cover 64 is released.

Figure 4:
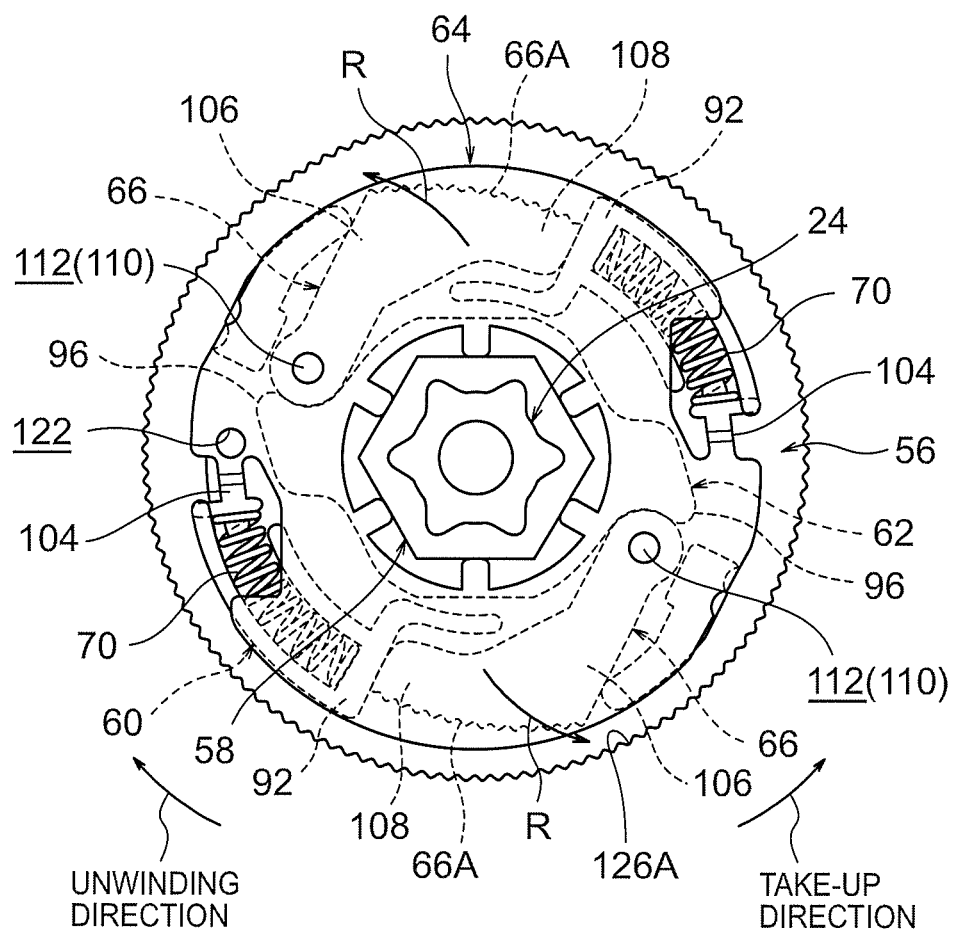
FIG. 4 is a diagram of the load transmission member illustrated in FIG. 3, illustrating a state in which clutch plates thereof have started to turn toward a lock ring.

The clutch guide 60 relatively rotates in the take-up direction with respect to the clutch cover 64, due to the urging force of the coil springs 70, the distance between each hole portion 112 of the clutch cover 64 (the turning axle 110 of each clutch plate 66) and the connecting wall portion 86 is reduced, and the distal end of the circular arc portion 108 is pushed (guided) in a tangential direction of the clutch guide 60. Accordingly, the clutch plate 66 is turned toward the lock ring 126 (the direction of arrow R in FIG. 4), and the plural teeth 66A of the clutch plate 66 mesh with the plural teeth 126A of the lock ring 126 (the state illustrated in FIG. 5). Thus, the clutch plates 66 and the lock ring 126 are coupled. At this time, the clutch plates 66 are pressed against the lock ring 126 by the anchoring portions 96 formed at the clutch base 62 pressing the base end portions of the arm portions 106 in the unwinding direction, and the state of coupling between the clutch plates 66 and the lock ring 126 is sustained. Therefore, rotation of the clutch base 62, and hence rotation of the sleeve 58, with respect to the lock ring 126 is restricted. In this state, a rotary force in the unwinding direction that is inputted to the spool 14 is transmitted to the frame 12 via the sub torsion shaft 24, the sleeve 58, the clutch base 62, the clutch plates 66, the lock ring 126 and the engaging member 128.

Then, in the state in which rotation of the sleeve 58 is restricted, if the body of the occupant tenses the webbing belt 16 with an even larger force, and a rotary force of the spool 14 in the unwinding direction due to this tension force exceeds a mechanical strength of the second energy-absorbing portion 54, the second energy-absorbing portion 54 twists and the spool 14 rotates in the unwinding direction by an amount corresponding to this twisting.

Accordingly, the webbing belt 16 unwinds from the spool 14 by the amount of rotation of the spool 14 in the unwinding direction. Thus, the load (burden) from the webbing belt 16 on the chest area of the occupant is moderated, and the energy introduced by the tensing of the webbing belt 16 is absorbed in an amount corresponding to the twisting.

Alternatively, if, before operation of the unillustrated lock mechanism described above, the ECU determines that a body size of the occupant is less than a pre-specified reference value on the basis of a signal from an unillustrated body size detector, the unillustrated gas generator is operated by the ECU.

When the gas generator operates, the engaging member 128 is turned and the state of coupling between the engaging member 128 and the recess portion 130 of the lock ring 126 is cancelled. Therefore, when the clutch mechanism 56 operates in this case, rotary force of the spool 14 is transmitted to the lock ring 126 via the clutch mechanism 56, and the lock ring 126 is turned in the unwinding direction together with the spool 14. Therefore, in this state, there is twisting of the first energy-absorbing portion 44 but there is no twisting of the second energy-absorbing portion 54, and there is no absorption of energy by the second energy-absorbing portion 54.

That is, this webbing take-up device 10 may, in accordance with the size of an occupant, selectively switch between a mode in which energy is absorbed by the second energy-absorbing portion 54 and a mode in which energy is not absorbed by the second energy-absorbing portion 54.

Next, principal portions of the present exemplary embodiment are described.

Figure 5:
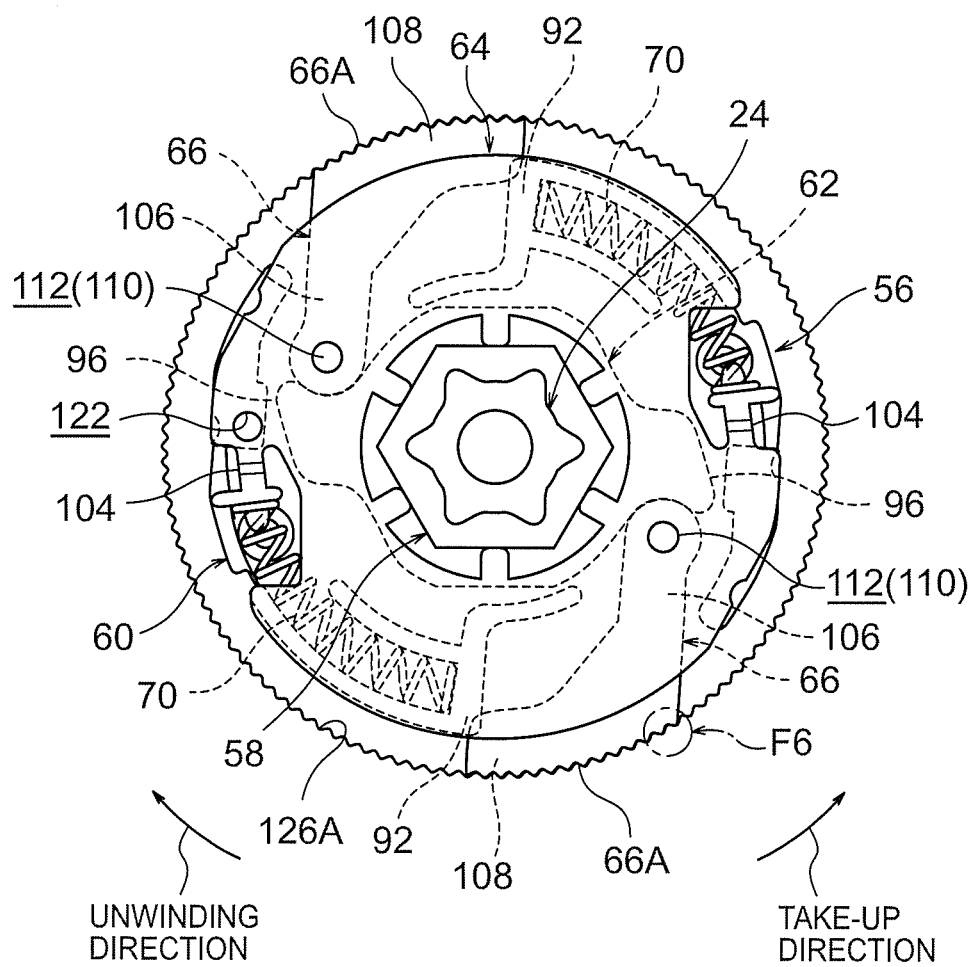
FIG. 5 is a diagram of the load transmission member illustrated in FIG. 3, illustrating a state in which the clutch plates are meshed with the lock ring.
Figure 6:
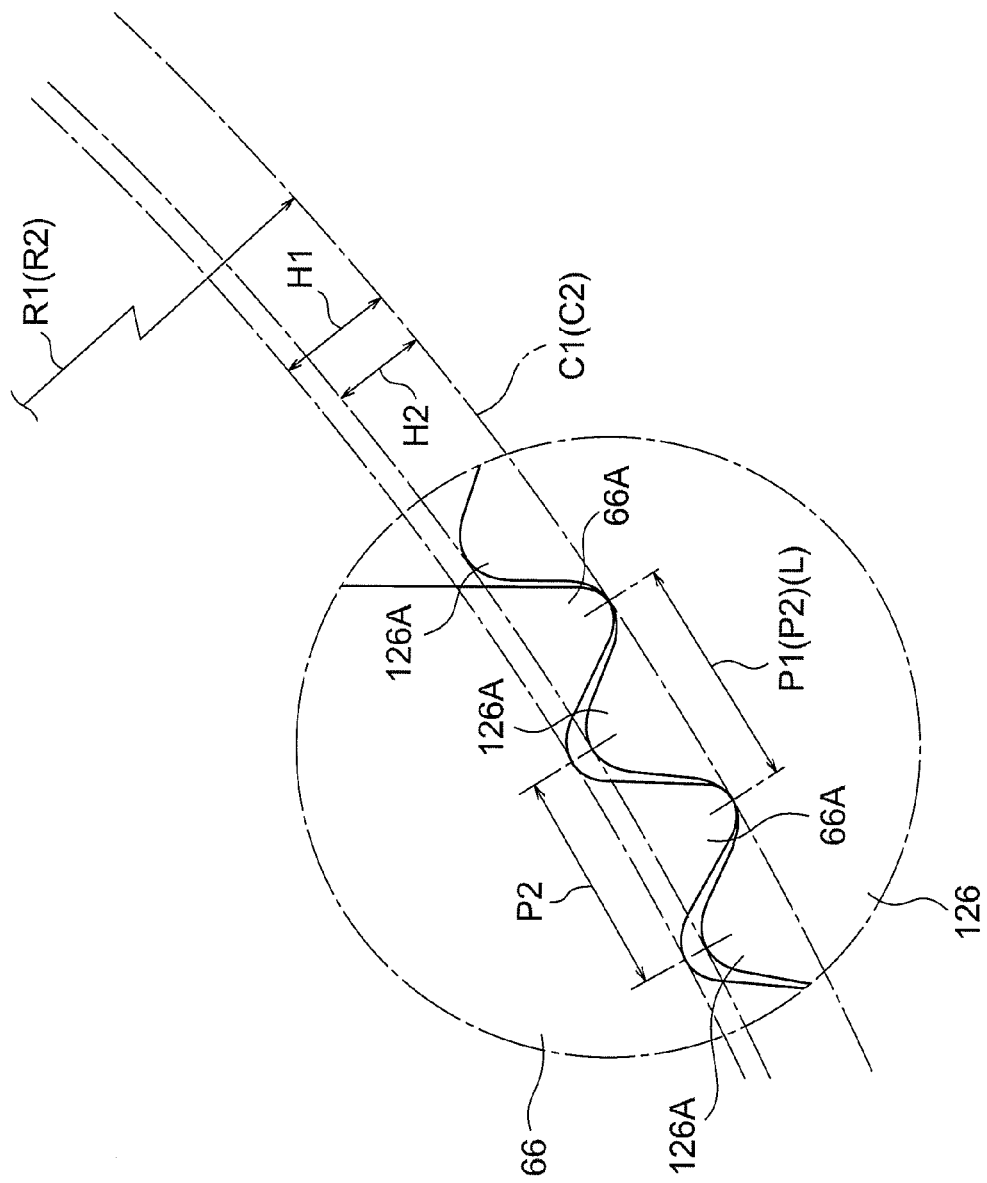
FIG. 6 is a magnified diagram in which the portion marked with the symbol F6 in FIG. 5 is magnified.

In FIG. 6, the state in which each clutch plate 66 described above is disposed at the position of meshing with the lock ring 126 is illustrated in a magnified diagram in which a portion of FIG. 5 (the portion denoted with the indication F6) is magnified. As illustrated in FIG. 6, the plural teeth 66A provided at the clutch plate 66 and the plural teeth 126A provided at the lock ring 126 form substantially triangular shapes as viewed in the axial direction of the lock ring 126, and the tooth tips and tooth bottoms are smoothly connected by curves. These teeth 66A and 126A are formed such that cross sectional areas thereof increase from the tooth tip sides to the tooth bottom sides.

In the present exemplary embodiment, a pitch P1 of the plural teeth 66A provided at the clutch plate 66 and a pitch P2 of the plural teeth 126A provided at the lock ring 126 are specified to be equal (P1=P2). Further in the present exemplary embodiment, as illustrated in FIG. 5, tooth tip portions of the clutch plate 66 (an outer periphery portion of the circular arc portion 108) are curvedly formed so as to match the inner periphery portion of the lock ring 126 in the state in which the clutch plate 66 is meshed with the lock ring 126. More specifically, in the present exemplary embodiment, as illustrated in FIG. 6, a radius of curvature R1 of a circular arc C1 that joins the tooth tips of the plural teeth 66A provided at the clutch plate 66 and a radius of curvature R2 of a circular arc C2 that joins the tooth bottoms of the plural teeth 126A provided at the lock ring 126 are specified to be equal (R1=R2).

In the present exemplary embodiment, a tooth height H2 of the teeth 126A of the lock ring 126 is specified to be lower than a tooth height H1 of the teeth 66A of the clutch plate 66. Therefore, in the state in which the plural teeth 66A provided at the clutch plates 66 are meshed with the plural teeth 126A provided at the lock ring 126, gaps are maintained between the tooth tips of the plural teeth 126A and the tooth bottoms of the plural teeth 66A, whereas the tooth tips of the plural teeth 66A abut against (touch) the tooth bottoms of the plural teeth 126A.

Furthermore, in the present exemplary embodiment, the clutch plates 66 are formed of, for example, a steel-based material, while the lock ring 126 is formed of for example, an aluminium-based material. Thus, a material strength of the lock ring 126 is specified to be lower than a material strength of the clutch plates 66.

Next, operation and effects of the present exemplary embodiment are described.

According to the webbing take-up device 10 with the above structure, as described above, in the mode in which energy is absorbed by the second energy-absorbing portion 54 of the sub torsion shaft 24, the teeth 66A of the clutch plates 66 mesh with the teeth 126A of the lock ring 126 (see FIG. 5) in the state in which relative rotation of the lock ring 126 with respect to the frame 12 is restricted. Therefore, the clutch plates 66 and the lock ring 126 are coupled and rotation of the clutch base 62 with respect to the lock ring 126 is restricted.

In this state, when the webbing belt 16 is tensed by an excessive load, rotary force in the unwinding direction acts on the spool 14, the sub torsion shaft 24, the sleeve 58 and the clutch base 62, and the arm portion 106 of each clutch plate 66 is pushed in the unwinding direction by the anchoring portion 96 of the clutch base 62. Thus, the clutch plates 66 are pushed against the lock ring 126, and a coupling strength between the clutch plates 66 and the lock ring 126 is sustained. At this time, the rotary force in the unwinding direction that is inputted to the clutch plates 66 from the clutch base 62 is supported by shear strength of the plural teeth 66A of the clutch plates 66 and the plural teeth 126A of the lock ring 126. Therefore, rotation of the sleeve 58 in the unwinding direction is firmly restricted. In this state, if the webbing belt 16 is tensed by an even larger force, the second energy-absorbing portion 54 of the sub torsion shaft 24 is twisted by the rotary force of the spool 14 in the unwinding direction due to this tension force, and the spool 14 rotates in the unwinding direction by an amount corresponding to this twisting. Thus, energy introduced by the tensing of the webbing belt 16 is absorbed.

Now, in this exemplary embodiment, the lock ring 126 described above is specified to have a lower material strength than the clutch plates 66. Further, in this exemplary embodiment, the tooth height H2 of the teeth 126A provided at the lock ring 126 (the member with the lower material strength) is specified to be lower than the tooth height H1 of the teeth 66A provided at each clutch plate 66 (the member with the higher material strength). Therefore, when the clutch plates 66 and the lock ring 126 mesh, the tooth tips of the teeth 66A provided at the clutch plates 66 come into contact with the tooth bottoms of the teeth 126A provided at the lock ring 126.

Therefore, the lock ring 126 receives a load in the unwinding direction from the clutch plates 66 at the tooth bottoms of the teeth 126A, at which the cross-sectional areas thereof are larger. In other words, because shearing forces are applied along the circular arc C2 joining the tooth bottoms of the plural teeth 126A of the lock ring 126, a length L of shearing portions of the teeth 126A may be kept at a maximum (L≈P1=P2). Thus, a shearing area of the lock ring 126 may be set to a maximum, and therefore coupling strength (torque transmission strength) between the clutch plates 66 and the lock ring 126 may be excellently maintained.

Therefore, a required coupling strength between the clutch plates 66 and the lock ring 126 may be maintained with minimal sizes of the teeth 66A and 126A. Therefore, reductions in size and weight of the clutch plates 66 and the lock ring 126 may be promoted, and hence reductions in size and weight of the device may be promoted.

Further, in this exemplary embodiment the radius of curvature R1 of the circular arc C1 joining the tooth tips of the plural teeth 66A provided at the clutch plate 66 and the radius of curvature R2 of the circular arc C2 joining the tooth bottoms of the plural teeth 126A provided at the lock ring 126 are specified to be equal. Therefore, when the clutch plates 66 and the lock ring 126 mesh (when the same couple), the tooth tips of the plural teeth 66A provided at each clutch plate 66 (the member with the higher material strength) may simultaneously come into contact with the tooth bottoms of the plural teeth 126A provided at the lock ring 126 (the member with the lower material strength). Thus, the coupling strength between the clutch plates 66 and the lock ring 126 may be realized at a maximum.

As described in detail hereabove, according to the exemplary embodiment of the present invention, reductions in size and weight may be promoted and coupling strength between the clutch plates 66 and the lock ring 126 may be excellently maintained.

The exemplary embodiment described above has a configuration in which the lock ring 126 that serves as the ring portion is formed separately from the frame 12 and is rotatably attached to (supported at) the leg piece 30 of the frame 12. However, the inventions relating to the first to fourth aspects are not limited this; configurations are possible in which the ring portion is provided integrally with the frame.

Further, the above exemplary embodiment has a configuration in which the plural teeth 66A of the clutch plate 66 and the plural teeth 126A of the lock ring 126 are formed by knurling or the like. However, the inventions relating to the first to fourth aspects are not limited this; methods of machining the plural teeth may be suitably amended.

The above exemplary embodiment has a configuration in which the material strength of the lock ring 126 that serves as the ring portion is specified to be lower than the material strength of the clutch plates 66 that serve as the pawl member. However, the inventions relating to the first to fourth aspects are not limited thus; configurations are possible in which the material strength of the pawl member is specified to be lower than the material strength of the ring portion.

The above exemplary embodiment has a configuration in which the radius of curvature R1 of the circular arc C1 joining the tooth tips of the plural teeth 66A provided at the clutch plate 66 and the radius of curvature R2 of the circular arc C2 joining the tooth bottoms of the plural teeth 126A provided at the lock ring 126 are specified to be equal. However, the inventions relating to the first to third aspects are not limited thus; configurations are possible in which the radiuses of curvature R1 and R2 are different.

The above exemplary embodiment has a configuration in which, when each clutch plate 66 (the pawl member) meshes with the lock ring 126 (the ring portion), the tooth tips of the teeth 66A provided at the clutch plate 66 come into contact with the tooth bottoms of the teeth 126A provided at the lock ring 126. However, the invention relating to the first aspect is not limited this. It is sufficient that the height of the teeth provided at the member with the lower material strength, of the pawl member and the ring portion, is specified to be lower than the height of the teeth provided at the member with the higher material strength. In such a case, the tooth tips of the teeth provided at the member with the higher material strength may be engaged with the tooth bottoms of the teeth provided at the member with the lower material strength when the pawl member and the ring portion mesh. Therefore, the member with the lower material strength receives a load from the member with the higher material strength at the tooth bottoms, at which the cross-sectional areas of the teeth are larger. Thus, a shear area of the member with the lower material strength may be specified to be larger, and coupling strength between the pawl member and the ring portion may be excellently maintained.

The above exemplary embodiment has been described for a case in which the present invention is applied to the load transmission mechanism 26 that transmits a load between the sub torsion shaft 24 and the frame 12. However, the present invention may be applied to a load transmission mechanism that transmits a load between a rotary member that rotates integrally with a spool and a frame.

In other respects, the present invention may be embodied with various modifications in a technical scope not departing from the spirit of the invention. It will be clear that the scope of rights of the present invention is not to be limited to the above exemplary embodiment.

What is claimed is:

1. A webbing take-up device comprising:
a rotary member that rotates integrally with a spool; and
a load transmission mechanism that transmits a load between the spool and a frame that rotatably supports the spool,
wherein the load transmission mechanism comprises:
a ring portion provided at the frame side thereof, a plurality of teeth being provided at an inner periphery portion of the ring portion, which inner periphery portion is concentric with the rotary member; and
a pawl member disposed at the inner side of the ring portion, the pawl member being supported at the rotary member to be movable to a meshing position, at which a plurality of teeth provided at a distal end portion of the pawl member mesh with the plurality of teeth provided at the ring portion, and
wherein the pawl member teeth have a material strength specified to be higher than the material strength of the ring portion teeth, and a tooth height of the teeth provided at the one is specified to be lower than a tooth height of the teeth provided at the other, and all of the ring portion teeth have a same shape, and all of the pawl member teeth have a same shape.

2. The webbing take-up device according to claim 1, wherein a tooth height of the teeth provided at the ring portion is specified to be lower than a tooth height of the teeth provided at the pawl member, so that when the teeth mesh, tooth tips of the higher strength, higher teeth provided at the pawl member come into contact with tooth bottoms of the lower strength, lower teeth provided at the ring portion.

3. The webbing take-up device according to claim 2, wherein the distal end portion of the pawl member is curved so as to match a curve of the inner periphery portion of the ring portion in a state in which the pawl member is disposed at the meshing position.

4. The webbing take-up device according to claim 3, wherein a radius of curvature of a circular arc joining the tooth bottoms of the plurality of teeth provided at the one of the ring portion or the pawl member is specified to be equal to a radius of curvature of a circular arc joining the tooth tips of the plurality of teeth provided at the other of the ring portion or the pawl member.

5. The webbing take-up device according to claim 1, wherein the distal end portion of the pawl member is curved so as to match a curve of the inner periphery portion of the ring portion in a state in which the pawl member is disposed at the meshing position.

6. The webbing take-up device according to claim 5, wherein a radius of curvature of a circular arc joining the tooth bottoms of the plurality of teeth provided at the one of the ring portion or the pawl member is specified to be equal to a radius of curvature of a circular arc joining the tooth tips of the plurality of teeth provided at the other of the ring portion or the pawl member.

* * * * *